April 18, 1933.  E. S. SMITH, JR  1,904,333

ORIFICE METER

Filed July 27, 1929

Ed S. Smith, Jr.
INVENTOR

BY Thomas A. Jenckes Jr.
ATTORNEY

Patented Apr. 18, 1933

1,904,333

UNITED STATES PATENT OFFICE

ED S. SMITH, JR., OF PROVIDENCE, RHODE ISLAND, ASSIGNOR TO BUILDERS IRON FOUNDRY, OF PROVIDENCE, RHODE ISLAND, A CORPORATION OF RHODE ISLAND

ORIFICE METER

Application filed July 27, 1929. Serial No. 381,475.

My invention relates to orifice differential producers and includes particularly improvements in the connections for orifice plates of this type to a differential responsive mechanism, whereby wide variations in flow may be more accurately metered.

An object of my invention is to provide two types of connections for orifice plates differential producers of this description, both upstream and downstream of said orifice, one a single point connection for chord orifices or other orifices which are unsymmetrical about one of two axes at right angles to each other in the plane of the orifice, to avoid the effect of upstream irregularities, elbows, T's, etc., and in addition an annular connection completely circular except for said point connection to obtain a true average pressure for circular orifices, thereby avoiding errors due to irregularities, such as rivet heads, tuberculations, etc. and also to obtain maximum responsiveness on pulsating flows. In conjunction with suitable flanges for said connections upstream and downstream of said orifice I provide means to alternately connect either said single point connections or said annular connections or both simultaneously to a pressure differential responsive metering device.

A further object of my invention is to provide an internal steadying cone in the upstream flange converging towards the orifice plate and preferably having the upstream end thereof of larger periphery than said conduit and the downstream end thereof of smaller periphery than said upstream end whereby the errors due to irregularities in pipe diameter upstream are substantially eliminated.

My invention is particularly adapted for use with an orifice plate having an orifice unsymmetrical about one of two axes, one of said axes passing through the single point pressure connection thereof, whereby extremely wide ranges of flow can be measured, the single point pressure connection for measuring small rates of flow and the annular pressure connection being near the less obstructed parts of the orifice for measuring larger rates of flow, whereby extremely wide ranges of flow can be measured.

A further object of my invention is to provide a pair of substantially symmetrical orifice flanges conveniently made from identical casings machined differently with the upstream flange adjacent said orifice plate being of smaller periphery than the conduit and the downstream flange adjacent said plate having a larger periphery than said orifice and the upstream flange whereby an unsymmetrical orifice or a concentric orifice may be employed and the orifice plate thereof centered without interfering with the flow in the conduit and whereby normal errors in centering the orifice do not produce an appreciable effect upon the differential produced thereby. Inasmuch as the inner periphery of the downstream flange is preferably larger than the inner periphery of the upstream flange it is obvious that if an orifice of equal diameter of said upstream flange is employed the downstream flange will not interfere with the flow.

A further object of my invention is to provide in combination with a pair of orifice flanges adapted to contain an orifice plate between them, an orifice plate having a plurality of arms projecting radially an equal distance therefrom and registering marks on said arms for centering purposes, said registering marks thus not interfering with the actual centering of the orifice plate itself and in concentrically machined flanges fitting the flanges even if the flanges should be of varying outside diameter.

Further objects of my invention are to eliminate the errors due to inaccurate location of pressure taps; to provide pressure pipe connections which can not project into the line of flow or be otherwise improperly made; to eliminate errors due to pipe friction between pressure connections; to provide a device in which the calibration can be made in the factory as well as in the field; to provide sufficiently large pressure passages for use on lively lines preventing lag in instrument responses and large enough passages for operating powerful registers; to provide a device, the orifice plate of which is readily interchangeable without breaking the pressure connections and to provide a device in which the installation thereof is not subject to gas or air troubles.

These and such other objects of my invention as may hereinafter appear will be best understood from a description of the accompanying drawing which illustrates an embodiment thereof.

In the drawing, Fig. 1 is a longitudinal sectional view of a conduit with my invention attached thereto.

Figure 1:
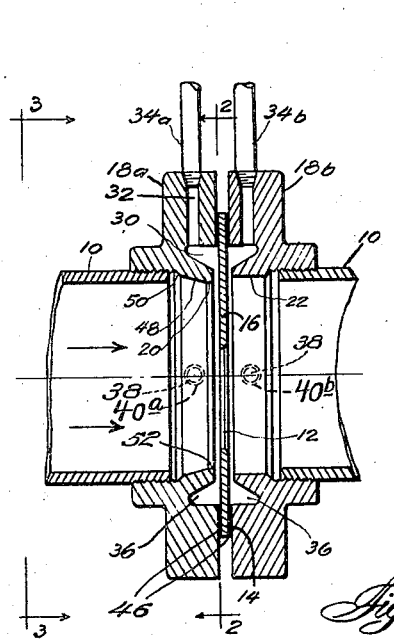

In the drawing, wherein like characters of reference indicate like parts throughout, 10 generally indicates the conduit. 12 generally indicates an orifice plate pressure differential producer of the orifice type having an orifice of a smaller size than the conduit to produce a differential in the pipe between the upstream and downstream sides thereof.

Figure 2:
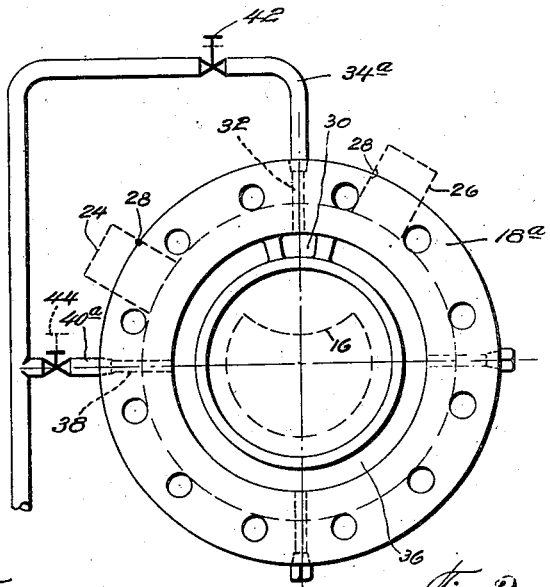
Fig. 2 is a cross sectional view of Fig. 1 taken along the line 2—2 of Fig. 1.
Figure 3:
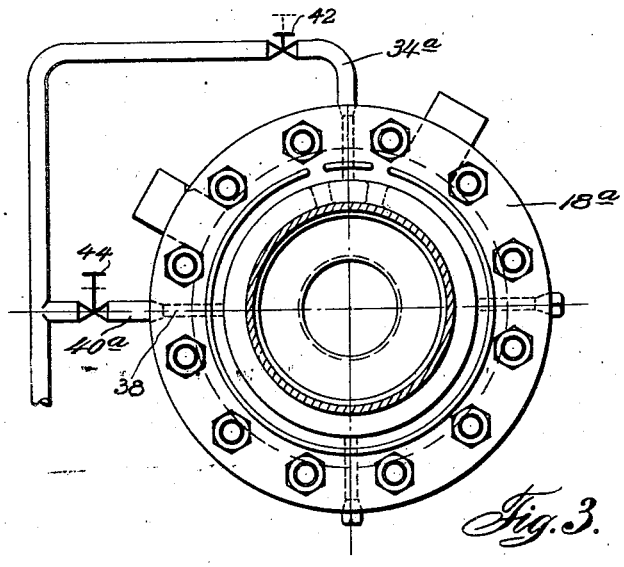
Fig. 3 is a cross sectional view taken along the line 3—3 of Fig. 1.

In my preferred embodiment said differential producer comprises the orifice plate 14 having the suitable orifice 12 employed therein. While orifice plates 14 having different orifices 12 such as the concentric orifices and chord orifices may be interchangeably employed, in my device I preferably employ a circular orifice 12 of the chord type having the chord or arcuate portion 16 thereof projecting inwardly of the orifice. By the word chord orifice I mean an orifice formed from the arc of a circle and a chord or another line cutting off a portion of the same circle. Advantages of this type of orifice particularly for metering small rates of flow are well known and by changing the pressure connections thereof to a different part of the circumference of the orifice, namely, from adjacent the chord 16 thereof when metering a small flow to adjacent a point of a larger diameter than the chord in the orifice for metering larger rates of flow I provide a device which will meter satisfactorily over a wide range of flow. To suitably connect a differential responsive device to my improved orifice I provide a novel type of upstream and downstream orifice flanges $18^a$ and $18^b$ as preferably made from identical castings, but with the upstream flange $18^a$ having a smaller inner periphery 20 adjacent the orifice plate than the pipe 10 and the downstream flange $18^b$ having a larger inner periphery 22 than the inner periphery 20 of the upstream flange $18^a$, whereby normal errors in centering the orifice do not produce an appreciable effect upon the differential produced thereby. The effect of having the inner periphery 20 of the upstream flange smaller than the pipe tends to reduce the effect of irregularities in pipe diameter upstream and having the inner periphery 22 of the downstream flange $18^b$ larger than the inner periphery of the upstream flange prevents errors in centering the orifice from producing an appreciable effect upon the differential produced thereby, such as would be caused by having the inner periphery 22 thereof projecting radially within said orifice 12. In order that the orifice plate may be accurately centered I preferably provide a plurality of arms 24 and 26 respectively projecting radially preferably equal distances outwards from the orifice plate and I provide registering marks such as the notches 28 cut in the side walls of said arms so that the orifice plate may be accurately centered between the flanges $18^a$ and $18^b$, said arms being thus free to slide between said flanges $18^a$ and $18^b$ until said orifice plate is accurately centered. As shown particularly in Fig. 2 both the upstream and downstream flanges $18^a$ and $18^b$ are provided with a single point pressure connection 30, whereby an orifice plate having an orifice unsymmetrical about one of two axes, one of said axes preferably passing through said single point pressure connection, is provided. Said connection 30 has a line 32 projecting laterally outwardly through said flanges $18^a$ and $18^b$ respectively to which the pipes $34^a$ and $34^b$ may be respectively connected. Said orifice flanges $18^a$ and $18^b$ are also provided with the annular connection 36 as shown particularly in Fig. 2 completely circular except for said point connection 30. Said flanges $18^a$ and $18^b$ are also provided with the ducts 38 projecting laterally outwards therefrom to which the pipes $40^a$ and $40^b$ may be respectively connected. I provide suitable means such as the valves 42 in said pipes $34^a$ and $34^b$ respectively and the valves 44 in the pipes $40^a$ and $40^b$ respectively to alternately connect either said single point connections 30 or said annular connections 36 or both of said upstream and downstream flanges simultaneously to a pressure differential responsive metering device. When it is desired to connect the metering device directly to a single point connection 30 for metering small rates of flow assuming that the chord orifice 12 shown in Fig. 2 is employed, the valves 42 are opened and the valves 44 are closed. When it is alternatively desired to connect the metering device to the annular connections 36, the valves 44 respectively are opened and the valves 42 are closed. As stated hitherto a chord orifice is preferably employed, whereby a single orifice may be employed by changing the connections to meter a relatively wide range, but if desired with metering small rates of flow a still more obstructed orifice than that shown may be changed to a concentric orifice with the annular connection for metering relatively larger rates of flow. Suitable gaskets 46 are preferably employed between the orifice plate 12 and the flanges $18^a$ and $18^b$ respectively. In order to eliminate the errors due to irregularities in pipe diameter upstream I provide a steadying internal cone 48 in said flange 18ᵃ converging towards said orifice plate 14 having the upstream end 50 thereof preferably of larger periphery than said conduit 10 and the downstream end 52 thereof adjacent said orifice plate of a smaller periphery than said orifice to permit said orifice to function as a differential producer.

It is understood that my invention is not limited to the specific embodiment shown and that various deviations may be made therefrom without departing from the spirit and scope of the appended claims.

What I claim is:

1. A metering device for a conduit, comprising an orifice plate and a pair of orifice flanges adapted to support said orifice plate between them, each flange having adjacent to said orifice plate a single point pressure connection and a second independent annular connection completely circular except for said point connection and in the same plane as said point connection, a pressure differential responsive indicating device, means whereby the single point connections of both said upstream and downstream flanges may be connected simultaneously to said pressure differential responsive indicating device and means whereby said annular connections to both said upstream and downstream flanges may be connected simultaneously to said pressure differential responsive indicating device.

2. A metering device, comprising an orifice plate and a pair of orifice flanges adapted to support said orifice plate between them, each flange having adjacent to said orifice plate a single point pressure connection and a second independent annular connection completely circular except for said point connection and in the same plane as said point connection.

3. A metering device for a conduit, comprising an orifice plate and a pair of orifice flanges adapted to support said orifice plate between them, each flange having adjacent to said orifice plate, a single point pressure connection and a second independent annular connection completely circular except for said point connection and in the same plane as said point connection, a pressure differential indicating metering device, means whereby the single point connections of said upstream and downstream flanges may be connected simultaneously to said pressure differential responsive indicating device and means whereby the annular connections of said upstream and downstream flanges may be connected simultaneously to said pressure indicating metering device, a conduit connected to each of said orifice flanges and a steadying internal cone in said upstream flange extending towards said orifice plate having the upstream end thereof of a larger periphery than each of said conduits and the downstream end of said cone of a smaller periphery than each of said conduits.

4. A metering device for a conduit, comprising an orifice plate and a pair of orifice flanges adapted to support said orifice plate between them, each flange having adjacent to said orifice plate a single point pressure connection and a second independent annular connection completely circular except for said point connection, a pressure differential responsive indicating device, means whereby the single point connections of said upstream and downstream flanges may be connected simultaneously to said pressure differential responsive indicating device and means whereby the annular connections of said upstream and downstream flanges may be connected simultaneously to said pressure responsive indicating device, a conduit connected to each of said orifice flanges and a steadying internal cone in said upstream flange converging towards said orifice plate.

5. A metering device, comprising an orifice plate and a pair of orifice flanges adapted to support said orifice plate between them, each flange having adjacent to said orifice plate a single point pressure connection and a second independent annular connection completely circular except for said point connection and in the same plane as said point connection, said orifice plate having an orifice symmetrical about only one axis, said axis being parallel to said single point connections.

In testimony whereof I affix my signature.

ED S. SMITH, Jr.